May 22, 1962 — E. G. MANGELS — 3,035,801
RETRACTABLE SUPPORT
Filed Nov. 27, 1959 — 5 Sheets-Sheet 1

Inventor
Erwin G. Mangels
Jack E. Dominik
Attorney

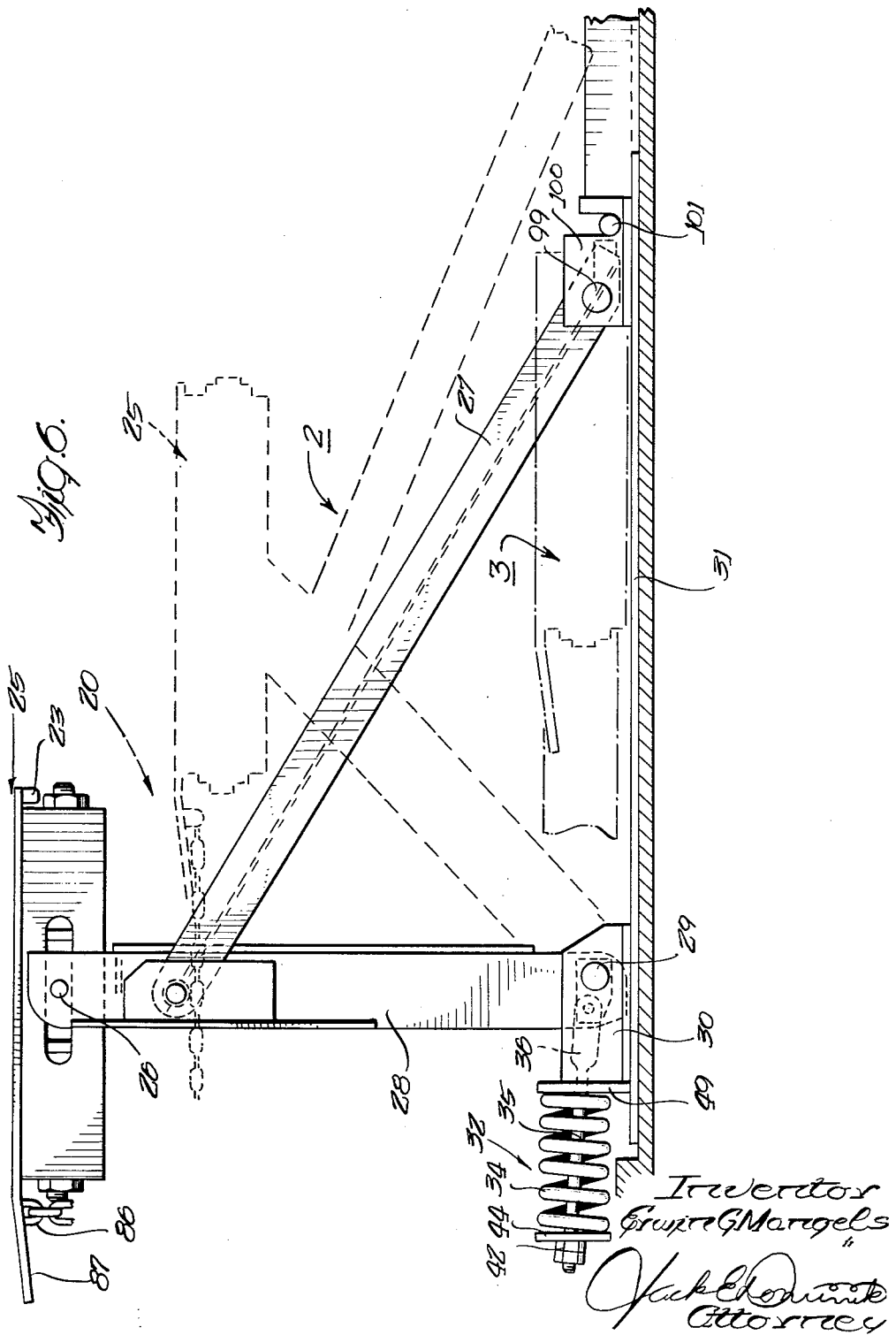

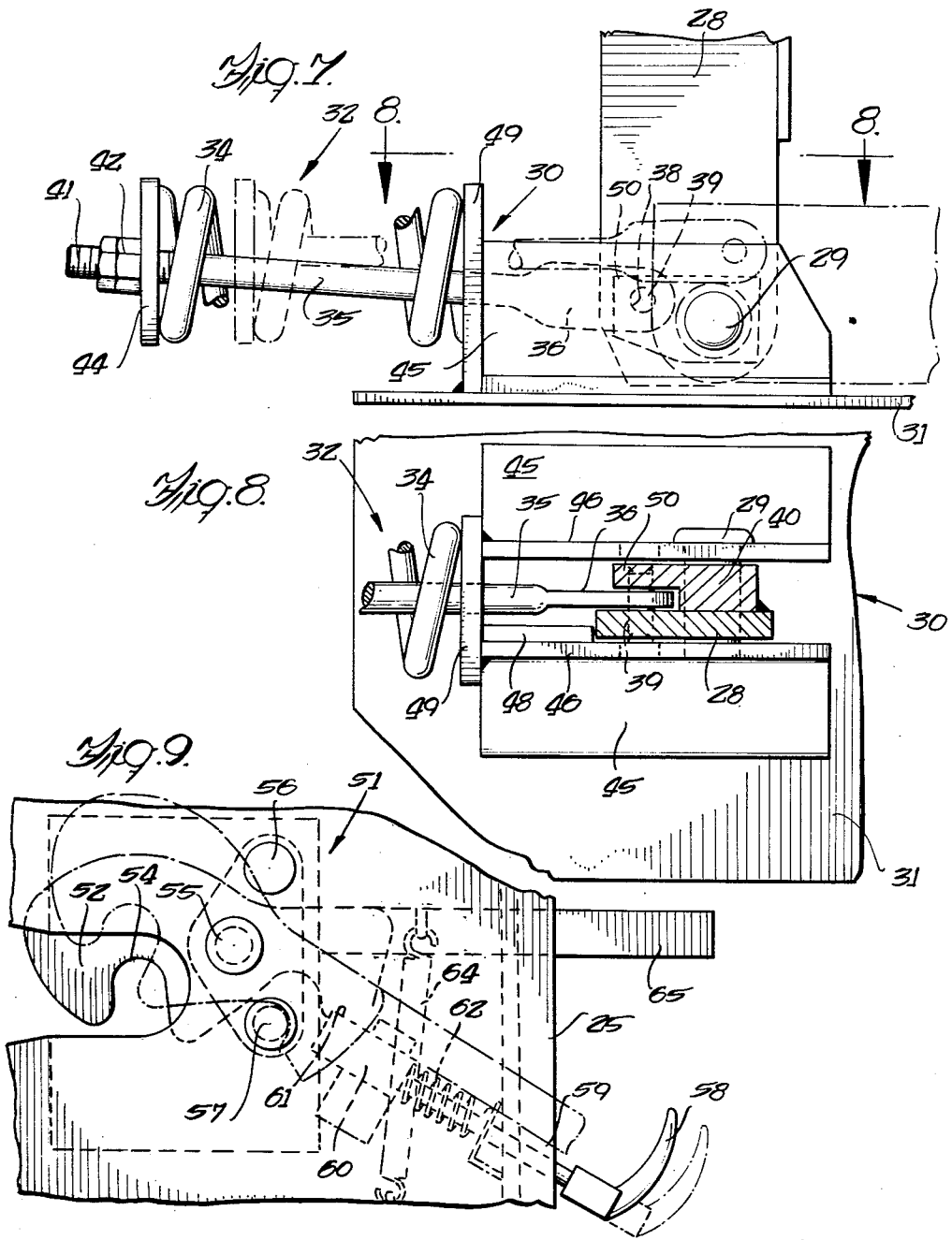

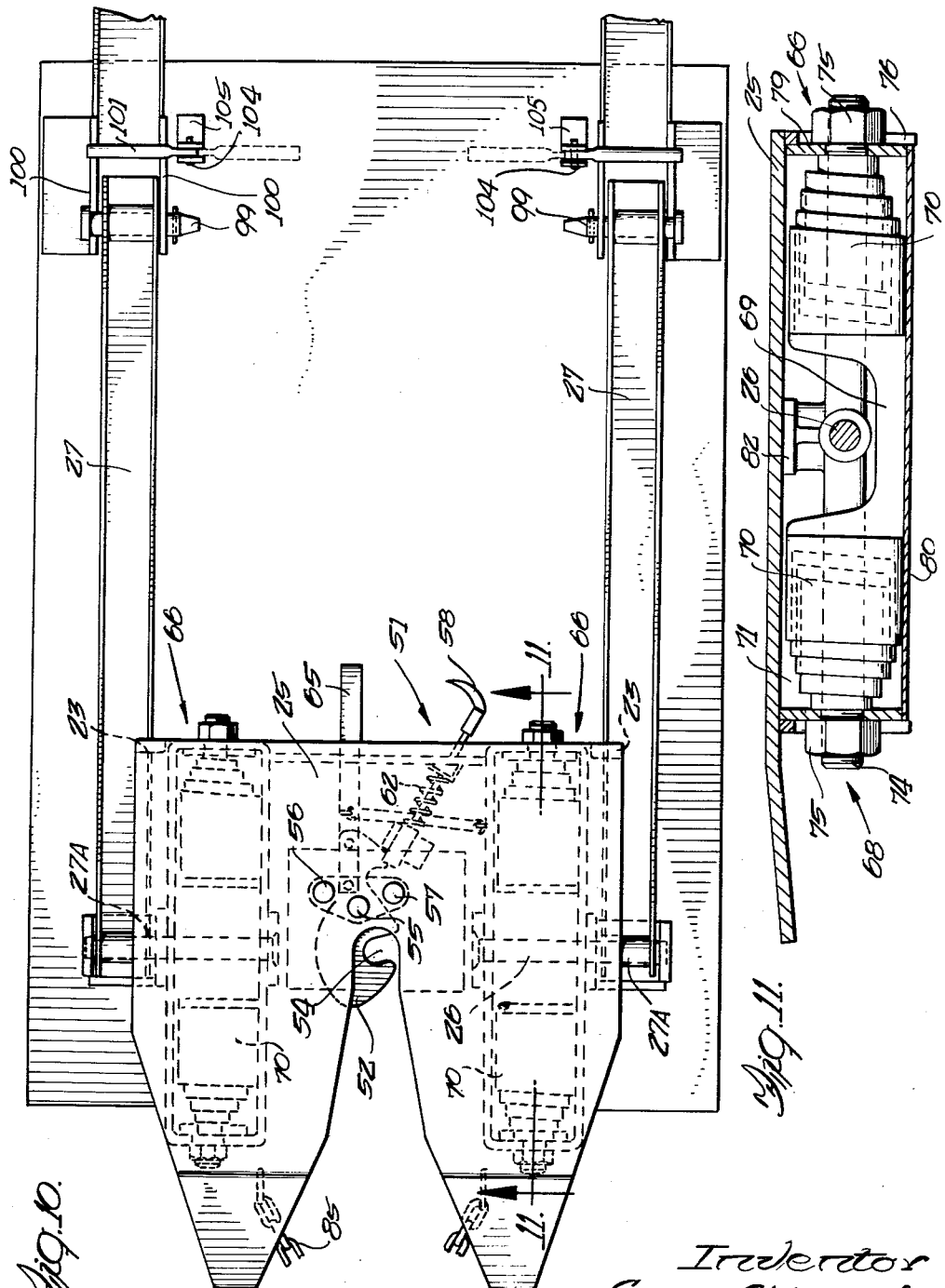

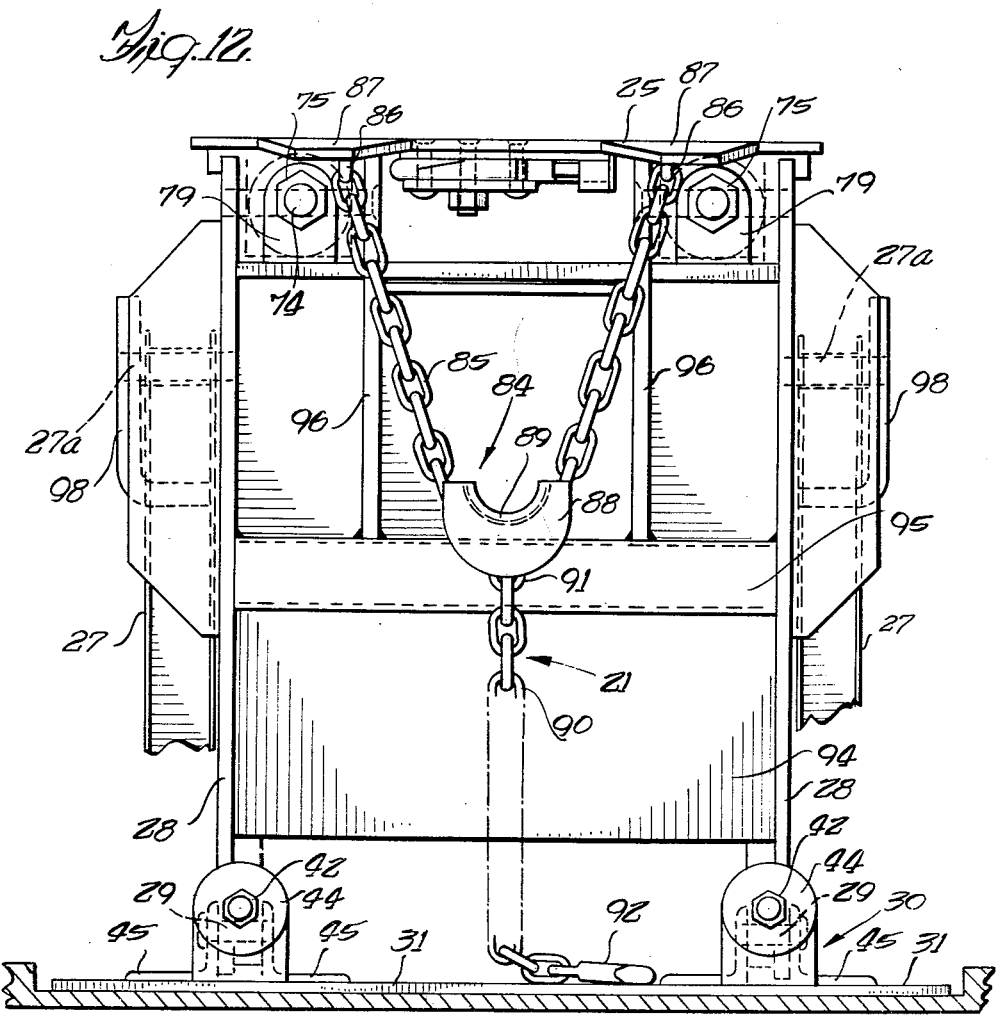
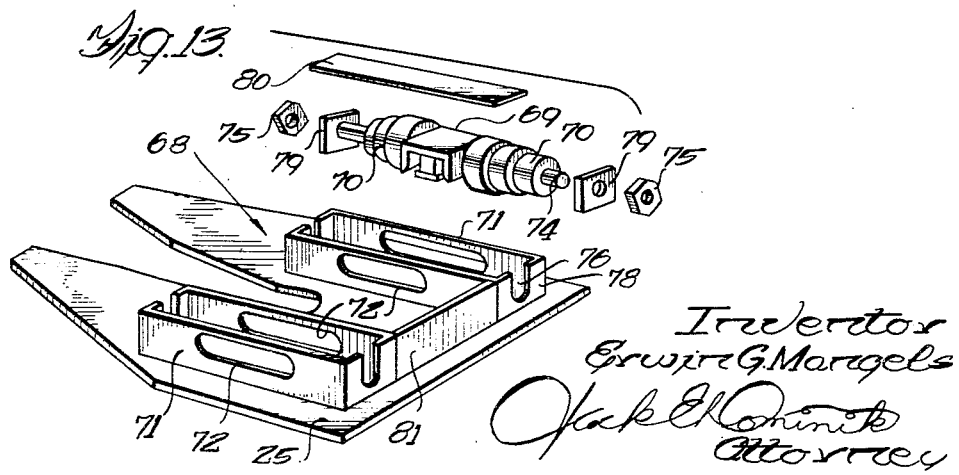

United States Patent Office 3,035,801
Patented May 22, 1962

3,035,801
RETRACTABLE SUPPORT
Erwin G. Mangels, Davenport, Iowa, assignor to Chicago, Rock Island and Pacific Railroad Company
Filed Nov. 27, 1959, Ser. No. 855,907
11 Claims. (Cl. 248—119)

The present invention relates to an improved retractable support, and finds its principal utility in connection with temporarily securing highway trailers on railway flat cars for transportation in connection with a railroad-truck operation better known as "piggy back." More specifically, the invention relates to improvements in such structures with regard to their spring suspension and retraction in order to improve and facilitate operations.

In pending application, patent application Serial No. 698,970, filed November 26, 1957 by Johnson and Keener (assignors to the assignee hereof), there is disclosed a structure for use as a retractable highway trailer support of the general character upon which the present invention is an improvement. As indicated above, the improvement relates to the spring suspension and guidance system for retraction and coupling with the highway trailer.

With the foregoing in mind, it is one of the principal objects of the present invention to furnish an improved retractable support having a spring shock system in which the counterbalance springs and the fifth wheel support springs serve a combined function in coupling the support to the highway trailer.

A further object of the invention is to provide a retractable support with a spring system which achieves a maximum utilization of a minimum number of springs, thereby reducing cost and imparting simplicity which improves the life of the unit and reduces the maintenance necessary.

Still another object of the invention is to effectively lower the silhouette of a retractable support to the irreducible minimum so that underhanging air cylinders and the like on associated highway vehicles will not become fouled or damaged by contact with the support in its retracted position.

Yet a further object of the invention is to provide a retractable support with a guidance system for the fifth wheel support plate which accurately correlates its angular relationship with the support portion and the associated highway trailer during the coupling operation.

Further objects and advantages of the present invention will become apparent as the following description of an illustrative embodiment proceeds, taken in conjunction with the accompanying drawings in which:

FIG. 6 is a side elevation of the retractable support taken in partial cross section through the base of the flatcar to which the support is attached and showing in phantom lines an intermediate stage of the support during retraction, and further showing the support silhouette in the fully retracted condition.

FIG. 7 is an enlarged, partially broken view of the lower end of the retractable support illustrating in detail the relationship between the counterbalance spring and the vertical support portion and showing in phantom lines different relative locations of the parts.

FIG. 8 is a top view in partial section of the counterbalance spring mechanism shown in FIG. 7 taken along section line 8—8 of FIG. 7.

FIG. 9 is a top view, partially broken, of the locking mechanism for locking the pintle of the highway trailer to the fifth wheel support mechanism showing in phantom lines two positions of the locking mechanism.

FIG. 10 is a top view of the improved retractable support mechanism in its upright or erected position showing in phantom lines the shock-absorbing spring system oriented at the lower portion of the fifth wheel support.

FIG. 11 is an enlarged transverse sectional view of one of the shock-absorbing spring-loaded members beneath the fifth wheel support taken along section line 11—11 of FIG. 10.

FIG. 12 is a front elevation of the retractable support mechanism shown in FIG. 10 in the fully erected position.

FIG. 13 is a partially broken, inverted, exploded perspective view of the fifth wheel support plate showing the assembled relationship between the spring suspension system and the mounting member therefor.

Figure 1:
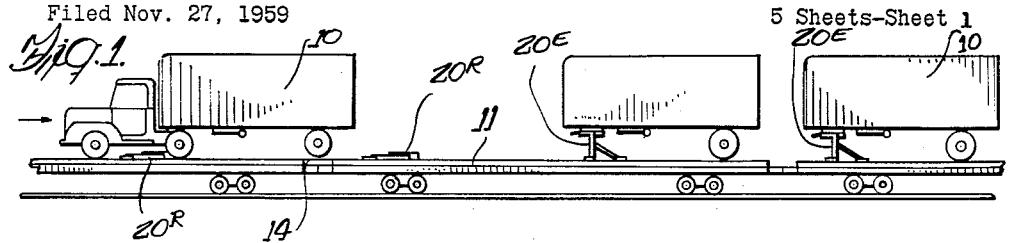
FIGURE 1 is a diagrammatic showing of a trainload of flatcars onto which highway trailers are being loaded utilizing an improved retractable support of the character contemplated by the present invention.
Figure 2:
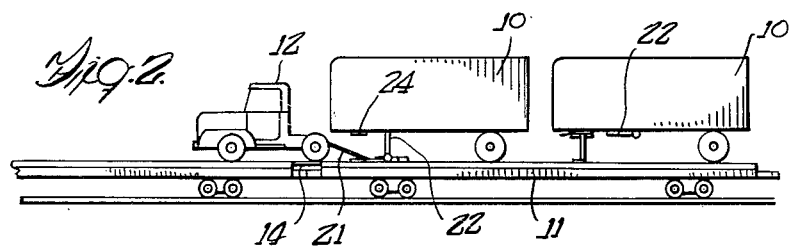
FIG. 2 is a sequential view subsequent to that shown in FIGURE 1 illustrating how the highway trailer is spotted in position and coupled to the tractor for coupling.
Figure 3:
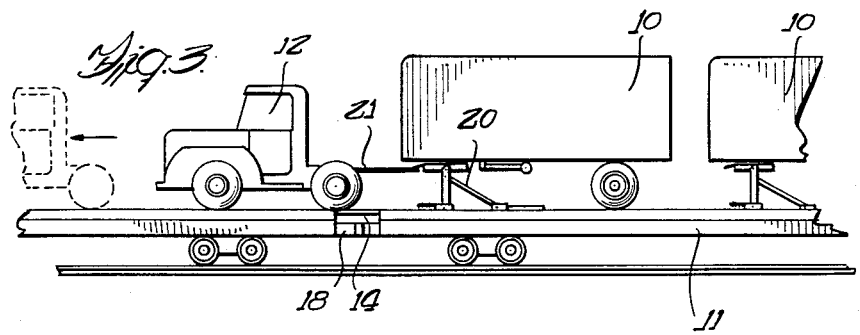
FIG. 3 is an enlarged view sequentially subsequent to that shown in FIG. 2 illustrating how the tractor serves as the motive power for erecting the retractable support and coupling it to the highway trailer.
Figure 4:
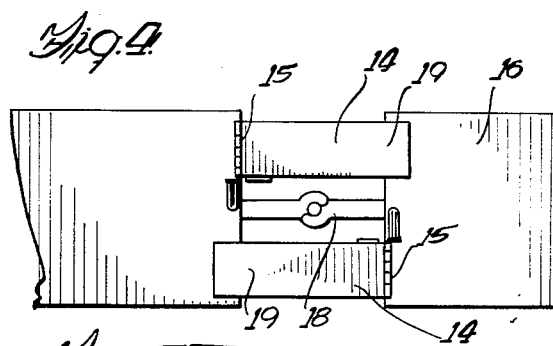
FIG. 4 is a top view of a joint between the two of the subject railway flatcars illustrating the retractable walkway upon which the highway trailer tractor drives to spot the trailers on the car.
Figure 5:
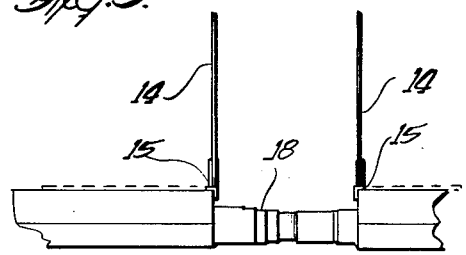
FIG. 5 is a side view of the walkways between the flatcars shown in FIG. 4 illustrating the walkways in their upward position as intended for travel along the railway track.

As pointed out above in the objects and description, the present invention constitutes an improvement in a retractable support of the general character disclosed in a pending patent application, Serial No. 698,970, filed November 26, 1957 by Johnson and Keener, assignors to the assignee hereof. The retractable support is employed in the manner generally shown in FIGS. 1 through 5. There it will be seen that the highway trailer 10 is removably secured to a railway flatcar 11 by means of the motive power of the highway trailer truck tractor 12. The flatcars are aligned longitudinally as they would be in a train and are joined by means of retractable treadways 14 (see FIGS. 4 and 5). Each retractable treadway 14 is secured by means of a hinge 15 to the floor 16 of the flatcar 11. The retractable treadways 14 are normally elevated into the position shown in FIG. 5 while the train is traveling; but, while the train is being loaded with highway trailers 10 as illustrated in FIGS. 1 through 3, the retractable treadway is lowered in order to provide a continous passage for the truck tractor and its trailers along the train. While there is a certain amount of play in the couplers 18 between the flatcars, the overlapping end portion 19 of the retractable treadway accommodates such variations.

The highway trailers 10 are supported on the flatcars 11 by means of the retractable support 20, shown at the right-hand portion of FIG. 1 in the fully erected and supporting position, but to the left-hand portion of FIG. 1 it is shown in the retracted position designated therein as 20(e) and 20(r) respectively. The highway trailer and tractor are backed into a position where the trailer is spotted over the retractable support. Thereafter, as shown in FIG. 2, the tow chain 21 is secured suitably to the rear portion of the highway tractor 12; and by driving the highway tractor 12 forwardly, the retractable support is fully erected and coupled with the highway trailer in a manner to be described in greater detail hereinafter. As will be noted in FIG. 2, the retractable landing gear 22 of the highway trailer 10 is lowered and placed into position so that the proper height is achieved for the trailer pintle 24, and then the highway tractor 12 can be pulled forward and bring the retractable support 20 into position. Thereafter the trailer landing gear 22 may be retracted into the position shown in the right-hand trailer in FIG. 2 and in FIG. 1. FIG. 3, in large scale, shows the retractable support 20 just as it engages the highway trailer pintle 24. Thereafter, as shown in the phantom lines in FIG. 3, the tow chain 21 is released from the highway tractor 12, and the tractor drives away to pick up another highway trailer for spotting on the succeeding car. Unloading is accomplished in the reverse manner, there being sufficient clearance beneath the retractable support elements 20 so that the rear end of the highway tractor 12 can bump into the retractable support after its locking pins are removed, and the retractable support collapses downwardly onto the flat car.

It will be appreciated that, during the operation as outlined above, the retractable support 20 is subjected to substantial stresses and shocks. This is particularly true at the exact moment when the upper portion of the retractable support 20 engages the locking pintle 24 of the trailer 10. In the event adequate provision is not made for cushioning this shock, substantial damage can be done to the pintle 24 as well as to the retractable support 20. In addition, because the retractable support must be heavily reinforced to withstand road stresses in transit, its weight is necessarily substantial. It is therefore necessary that the effective weight of the retractable support be counterbalanced in order that the support 20 may be erected with a minimum of effort on the part of the towing tractor 12. Similarly the counterbalance serves to cushion the fall of the metal parts when the retractable support 20 is lowered. It is with the provision of yieldable means and adequately self-compensating and self-aligning towing means that the present invention concerns itself primarily.

The general nature of the linkage and motion involved is detailed in FIG. 6. There it will be seen that the retractable support 20 contemplates a fifth wheel support portion 25 which is secured by means of a hinge pin 26 to a vertical stand member. The vertical stand member, in turn, is coupled by means of a hinge pin 29 to the base member bracket 30 and then to the base 31. As the vertical stand member 28 moves rearwardly, the fifth wheel support 25 will tend to tilt rearwardly and, unless arrested, can jam the retraction by locking against the trailing link 27. To insure against this condition, a pair of retraction guide shoes 23 are positioned beneath the rear corners of the top plate 25 and engage the trailing links 27 during retraction (as shown in FIG. 6), thereby aligning the fifth wheel support until the fully retracted nested condition is achieved. As the retraction occurs as outlined in the various stages shown in FIG. 6, the mass of the support 20 tends progressively more to retract the entire unit onto the base 31. To counteract this tendency, the counterbalance spring assembly 32 is provided at the forward portion of the base member bracket 30. The details of construction of the counterbalance spring assembly 32 and its cooperative relationship with the fifth wheel support member 25 as well as the tow chain 21 will appear in detail hereinafter.

FIG. 7 shows the counterbalance spring assembly 32 in greater detail and through various positions in its operation. The phantom lines of FIG. 7 exemplify the position of the parts as the stand approaches the lowered or horizontal position after passing the point of maximum moment or torque. The counterbalance spring 34 is a heavy duty coil spring which is threaded coaxially over a spring link or counterbalance spring rod 35. The counterbalance spring rod 35 has a flattened end 36 with a hole 38 threaded by a counterbalance spring rod hinge pin 39 whereby the counterbalance spring assembly 32 is pivotally secured to the counterbalance spring crank 40.

The end of the counterbalance spring link 35 opposite the flattened end 36 has a threaded portion 41 with which the counterbalance spring adjustment nuts 42 are threadedly engaged. The counterbalance spring adjustment nuts 42 bear against a counterbalance butt plate 44 and provide for the adjustment of the loading on the counterbalance spring 34. At the opposite end of the counterbalance spring 34 is the base member bracket generally designated as 30. The base member bracket 30 comprises a pair of L-shaped members 45, the vertical side walls 46 of which are in parallel and flanking relationship with the counterbalance spring crank 40 and vertical stand 28, and joined by means of the hinge pin 29. A vertical stand member stop block 48 is fixed to one side of a vertical side wall 46 in order to abut the vertical stand member 28 and arrest its forward movement at a point beyond the vertical. This additional travel permits the trailing link lock pins 99 to fall in place as will be described hereinafter. At the far end of the L-shaped members, a base member bracket spring butt plate 49, or spring stop, is secured by welding in place. The spring stop has link guide means through which the link 35 passes. Thus, a pair of butt plates 44, 49 are provided at the respective ends of the counterbalance spring 34, and the action of the adjusting nuts 42 along the link 35 permit the counterbalance spring 34 to be adjustably loaded as between the two butt plates, with the load being transmitted through the end of the link 35 to the crank 40.

The crank 40 is provided with an eccentric portion 50 which is positioned with relation to the vertical support member 28 so that, when the vertical support member is in the vertical position, there will be a slight torque exerted by the counterbalance spring 34 against the crank holding and urging the vertical support member 28 in the forward position against the stop block 48. The torque or moment is the product of the radial distance between the pins 29 and 39 times the force component of the spring which is perpendicular thereto. The torque or moment about the pin 29 can also be stated as the total spring force times the effective moment arm, it being understood that the effective moment arm is the perpendicular distance between the line of the spring force and the center of pin 29. When the vertical support member 28 is moved rearwardly, the spring force and the effective moment arm both increase up to a point where all, or substantially all, of the spring force is along the line which is perpendicular to the radial distance between the pins 29 and 39. It is at this point where the moment is the greatest. Thereafter, as the vertical support member 28 is moved rearwardly to the dotted line position in FIG. 7, the moment decreases because of the decreasing perpendicular component of the spring force, or alternatively because of the decreasing moment arm, according to which manner of calculating the moment is used. Thus, the torque or moment exerted by the spring-and-eccentric is caused to increase up to a maximum and then to decrease. In analyzing the mechaniscs of the operation, it must be borne in mind that the increase-and-decrease feature is achieved because the spring force and its moment arm must be perpendicular. As the vertical support member 28 and its associated fifth wheel support plate move rearwardly to the position indicated in phantom lines as 2 as illustrated in FIG. 6, the effective moment of the counterbalance spring 34 is increased to its maximum effort at the very point where the mass of the retractable support is tending to urge it downwardly against the base 31. As the vertical support member 28 continues to move rearwardly, the moment of the counterbalance spring 34 decreases, but the compression of the spring—being not entirely a straight line function as it approaches maximum compressibility—is increased, thus decreasingly counterweighting the retractable support mass but not in a straight-line function. Therefore, the counterbalance spring 34 can be adjustably compressed by the adjustment nuts 42 at the retracted position generally indicated by 3 in FIG. 6. Thus, when retracting from the intermediate balanced position, the mass will assist in lowering the retractable support. Similarly, as the mass is moved forwardly of the intermediate position, the effort of the spring tends to move the entire retractable support into its vertical and engaged condition.

The significance of the particular effect created by the counterbalance spring assembly will be more fully appreciated when its cooperative relationship with the yieldable means in the fifth wheel support member 25 is appreciated, as well as the nature of the impact locking mechanism provided in the fifth wheel support assembly 25. In FIG. 9 there is shown a detailed view of the impact locking mechanism generally designated by the numeral 51. The head 52 of the impact lock mechanism resembles somewhat the automatic coupling employed to couple railway cars. A pintle recess 54 operates when the fifth wheel support plate moves forwardly to engage the trailer pintle 24. The pintle recess 54 of the locking head 52 is engaged with an impact, the force of the impact being to pivot the locking head 52 in a counterclockwise direction as seen in FIG. 9 until the pintle recess 54 surrounds the trailer pintle 24. Then the recessed rear shoulder 61 of the locking head 52 is engaged by the lock block 60 and securely locks the locking head 52 in place around the pintle. It will be appreciated that severe damage could occur to the locking mechanism as well as to the trailer pintle in the event the forward motion of the retractable support is not arrested sequentially by the impact lock, fifth wheel support spring assembly, and stop block 48. These foregoing actions are simultaneously excited by the counterbalance spring 34.

Turning now to FIG. 10, it will be seen that the volute spring assemblies are oriented in parallel and in flanking relationship with the locking assembly 51. Referring now to FIG. 11 which is a cross section taken through one of the volute spring assemblies, it will be seen that the horizontal support plate 25 serves as the cap or top for the volute spring assembly which is housed within a volute spring assembly box 68. The volute spring assembly box 68, as will be described in greater detail hereafter, provides a means for housing the friction block 69 which serves several purposes in conjunction with the pairs of the volute springs 70.

As will be noted by turning to FIG. 13, the volute spring assembly box 68 comprises a pair of side plates 71, each of which has an elongate slot 72. The elongate slot 72 is provided to accommodate the fore and aft sliding motion of the upper hinge pin 26 (see FIG. 6). A volute spring tie rod 74, or spring link, extends from each end of the friction block 69, and the end of the tie rod 74 is threaded in order to engage the assembly and adjustment nuts 75. The ends of each of the volute spring assembly boxes 68 are provided with a slot 76 and an end plate portion 78, thereby defining a collar. The slot in the end plate portion 78 is of such a diameter as to accommodate the tie rod 74 as well as the adjusting nut 75 on the threaded end of the tie rod.

As will be observed in FIG. 13, the assembly is facilitated by the unique structure of the volute spring box. The volute springs 70 are placed along the tie rods 74 which, in turn, are secured to the cross block 69. Thereafter the volute spring butt plates 79 are aligned along the tie rods 74, and the adjusting nuts 75 are tightened on the ends of the rod 74 so that the volute springs can be preloaded. Thereafter the entire assembly is placed within the volute spring assembly box 68, and the bottom plate 80 is welded in place, thereby holding the entire volute spring assembly within the volute spring assembly box 68 and ready for activation upon attachment of the hinge pin 26 with the vertical stand member 28. A cross tie plate 81 is secured between the two end plates 78 to provide an anchor for the locking mechanism 51, and also to reinforce the area between the volute springs against any tortional loads.

Operation may conveniently be visualized by reference to FIGS. 6 and 11. Pretend for a moment that the pin 26 is fixed and that it is desired to move the upper plate 25. Pin 26, being fixed, therefore holds the tie rods 74 in place. Assume that the plate 25 is moved to the left as seen in FIGS. 6 and 7. It will then be observed that the volute spring box moves with the plate and therefore causes the right hand volute spring to be compressed. A similar action involving compressing of the left hand volute spring occurs when the plate is moved to the right. In operation, as the plate 25 moves, friction is generated between the pedestal 82 and the plate 25.

The operation of the volute spring assembly will be better understood by reference to FIG. 11. When the pintle is caused to move up against the locking head 52 as a result of starting or stopping as the locked highway trailer shifts fore and aft, the load is transmitted from the top plate 25 onto the hinge pins 26. The hinge pins 26 then immediately transfer the load forwardly or rearwardly onto the friction block 69. The friction block upper pedestal 82 abuts against the bottom of the top of the fifth wheel support plate 25. Immediately, then, there is a frictional resistance to fore and aft movement which is a "starting friction" resistance. If the load is in excess of the starting friction generated between the pedestal of the friction block against the top support plates 25, then the load is transferred to the two volute springs, the volute springs 70 serving to operate "series" against the friction block 69. Thus, the operation of the spring assembly in cushioning the jolt against the highway trailer pintle is first one of starting friction, and then one of the progressive application of the load of a volute spring, the two volute springs on each side operating in series to reinforce each other. A volute spring is non-harmonic, and is one in which the resistance progressively increases as the spring is compressed. In addition, the interface friction between the coils of the volute spring further provides frictional resistance and energy absorption which dissipate the energy so that the return work of the spring is of lesser magnitude than that required for its compression. It will be appreciated, of course, that this action works in either direction irrespective of whether the load is a forward load or a rearward load. It will be further appreciated that the action of the two volute spring assemblies on either side of the locking mechanism is such as to center the fifth wheel support plate 25 as well as to cushion the load. This cushioning effect of the volute spring assemblies takes place when the highway trailer pintle 24 is being engaged in the locking and unlocking stages as well as while the unit is operating on the road.

The coaction between the tow chain 21, yoke assembly 84 and spring suspensions to additionally insure accurate and aligned engagement of the locking assembly 51 with the highway trailer pintle is best illustrated in FIG. 12. The tow chain is comprised of two principal elements, a short chain 85 which is secured at its two ends to U-shaped anchors 86 secured beneath the forward jaws 87 of the top plate 25. As is apparent in FIG. 6 and FIG. 12, the forward jaws 87 of the top plate 25 are angled downwardly in order to insure a smooth approach to the pintle support plate of the trailer and tilt the forward edge of the fifth wheel support plate 25 downwardly to a horizontal position in the event the joint at the hinge pin 26 is stiff due to grease, dirt, other contaminents, and principally due to cold weather. The length of the short chain 85 is such that, when it sags beneath the fifth wheel support plate 25 in the upright position as illustrated in FIG. 12, the yoke 88 is at an approximate mid-point in the vertical stand portion. The yoke is of such construction that it is semi-circular or crescent-shaped in configuration, permitting the lower portion of the short chain 85 to reave around its central shoulder 89. The main tow chain 90 attaches at a single U-shaped link 91 at the forward end of the yoke 88, and at its far end is provided with a J-shaped hook 92 for attachment to the highway tractor at a convenient point on its rear portion, or by wrapping around its rear axle or other sturdy element and hooking the hook back on the chain 90. In this manner, in the event the main tow chain portion 90 is off center of the vertical stand portion, the yoke 88 will automatically compensate by varying the two lengths of the divided short chain 85 in order to accomplish equal pull on the fifth wheel support plate 25. Additionally, the forward and somewhat downward pull of the fifth wheel support plate serves to assist in horizontally aligning the same as the support plate is raised in accordance with the configurations as shown on FIG. 6.

The forward view of the stand portion as illustrated in FIG. 12 reveals a sturdy construction wherein the vertical stand members 28 are cross braced by means of a support plate 94. A cross tie member 95 further reinforces the two vertical stand members 28 and has extending upwardly from it a pair of intermediate vertical supports 96. The I-beam configuration of the trailing links 27 reinforces the trailing links, the ends of which are bored to receive the trailing link hinge pin 27A which secures the trailing links 27 to the stirrups 98 which are, in turn, fastened to vertical support members 28.

The rear portion of the trailing links 27 are lockingly secured in place by means of trailing link lock pins 99 which are driven through the trailing link lock jaw 100 through holes provided therein for that purpose. Trailing link stop pins 101 are swivelled at their rear end portions by means of pin 104 attached to the bracket 105, so that the lock pin 101 may be pivoted and rested atop the trailing link 32 when in the retracted position, and will drop by means of gravity against the rear end of the trailing link 32 as the retractable support is raised to its elevated position. Thereafter the driver of the tractor can back the unit, or leave it alone knowing that the trailing links 32 are properly oriented for driving the trailing link lock pins 99 into the secured position. Suitable safety pins or other locking devices are then provided to lockingly and securely engage the trailing link lock pins 99 in position for travel down the railway.

Prior to retracting the unit, the trailing link stop pins 101 are pivoted inwardly onto the bed of the unit as shown in the position in phantom lines on FIG. 10. Thereafter the operator, when wishing to retract the unit and pick up the highway trailer, backs the tractor up against the vertical stand as illustrated in FIG. 12, and pushes the unit rearwardly after the locking mechanism 51 has been disengaged by moving the locking handle 58 and then the unlocking lever 65. As the unit is backed downwardly, the counterbalance springs begin to effect their counterbalancing action as the unit moves to its mid-point achieving a maximum counterbalancing action substantially at that point, and thereafter permitting the mass of the retractable support to drop it down to the base 31 where it is in position for allowing a tractor and trailer to drive over it with a minimum of extension above the base of the flat car. It is important that the silhouette of the retractable support unit 20 in its retracted position be as low as possible inasmuch as the modern highway trailer and tractors have air cylinders and the like which oftentimes have a road clearance not exceeding 7 inches. In the event the tires are soft as caused by unpredictable cold weather, the clearance can often drop to 6 inches. With the construction of the counterbalancing mechanism and the remainder of the retractable support as shown and described herein such low silhouette may be achieved with the additional advantages of support, stability, and durability and ease in operation as outlined above.

While there are various alternatives and equivalent constructions may be assembled following the teachings of the present invention, there is no intention to limit the scope of the invention to the device herein shown and described in detail. On the contrary, it is the intention that the invention is to be interpreted in light of all equivalent and alternative constructions as contemplated by the following claims.

What is claimed is:
1. In a retractable support having a base, a fifth wheel support plate with a forwardly opening jaw an impact lock means at the inner portion of the jaw for impact engagement with a pintle, a vertical support member, and a trailing link; and hinge means connecting the trailing link to the vertical support member, the fifth wheel support to the vertical support member, and the vertical support member to said base; the spring system comprising, in combination, a counter-balancing compression spring, eccentric means for connecting the counter-balancing compression spring to said vertical support in compression to urge said vertical support toward a vertical position, a spring suspension means for connecting the fifth wheel support plate to the vertical support member, and a friction block frictionally engaging said fifth wheel support plate at the connection between the spring suspension and vertical support member.

2. In a retractable support having a base, a fifth wheel support plate with a forwardly opening jaw, an impact lock means at the inner portion of the jaw for impact engagement with a pintle, a vertical support member, and a trailing link; and hinge means connecting the trailing link to the vertical support member, the fifth wheel support to the vertical support member, and the vertical support member to said base; the spring system comprising in combination, a counter-balancing compression spring, eccentric means connecting the counter-balancing compression spring to the vertical support member at the lower portion thereof, a volute spring suspension means for connecting the fifth wheel support plate to the vertical support member, and a friction block frictionally engaging said fifth wheel support plate at the connection between the spring suspension and vertical support member.

3. For use in a retractable support with a fifth wheel support having a central jaw portion and a vertical support member, a pair of spring boxes beneath the fifth wheel support and in fore and aft orientation flanking the fifth wheel support jaw, a pair of friction blocks each having a central transverse bore and each being disposed, respectively, within each spring box and frictionally engaging the bottom of the fifth wheel support which serves as the top of the spring box, a pair of spring links extending fore and aft of each friction block, a collar partially closing each end of the spring box, a spring butt at each end of each link sufficiently large to engage the inner portion of the spring box end collars, adjustment means on the end of each link engaging each spring butt, a volute spring between each spring butt and the friction block coaxially around each link, hinge means at the top of each vertical support member, and a hinge pin extending through each friction block and engaging the vertical support hinge means whereby the mass of the fifth wheel support rests on the friction blocks thereby providing a starting friction resistance subsequently translated into compression of the axially alined volute springs.

4. For use in a retractable support with a fifth wheel support having a central open jaw portion and a vertical support member, a pair of spring boxes beneath the fifth wheel support and in fore and aft orientation flanking the fifth wheel support open jaw, a pair of friction blocks each having a central transverse bore and each being disposed within each spring box and frictionally engaging the top of the spring box, a pair of spring links extending fore and aft of each friction block, spring butt means at each end of each link respectively disposed to engage the spring box ends, a volute spring between each spring butt means and the friction block coaxially around each link, hinge means at the top of each vertical support member, and hinge engaging means hingedly securing each friction block to the vertical support hinge means whereby the mass of the fifth wheel support rests on the friction blocks thereby providing a starting friction resistance subsequently translated into compression of both of the axially alined volute springs.

5. For use in a retractable support having a fifth wheel support, said fifth wheel support having jaws defining a central open portion, and a vertical support member, a pair of spring retaining means beneath the fifth wheel support and in fore and aft orientation beneath the fifth wheel support jaws, a pair of friction blocks each disposed within the spring retaining means and frictionally engaging the base of the fifth wheel support, a pair of spring links extending fore and aft of each friction block, spring butt means at each end of each link respectively disposed to engage the spring retaining means, a volute spring between each spring butt means and the friction block coaxially around each link, and hinge means at the top of each vertical support member hingedly securing the latter to each friction block whereby the mass of the fifth wheel support rests on the friction blocks thereby providing a starting friction resistance subsequently translated into compression of both of the axially alined volute springs.

6. In a retractable support having a fifth wheel support, a vertical support member, a base, a trailing link, and first hinge means coupling the support to the member, second hinge means joining the member and the base, and third hinge means hinging the trailing link to the member; a spring counter-balancing system comprising, in combination, a crank coupled to the vertical support member adjacent the second hinge means, a link pivoted at one end to the crank, a spring stop and link guide secured to the base adjacent the vertical support member and having link guide means, spring butt means at the other end of the link, and a compression spring threaded by the link and positioned between the spring stop and the spring butt means whereby the mass of the retractable support upon rearward retraction is counter-balanced by the compression of the spring and are assisted by the spring upon being raised.

7. In a retractable support having a fifth wheel support, a vertical support member, a base, a trailing link, and first hinge means coupling the support to the vertical member, second hinge means joining the vertical member and the base, and third hinge means hinging the trailing link to the vertical member; a spring counter-balancing system comprising, in combination, a crank coupled to the vertical support member adjacent the second hinge means, a link pivoted at one end to the crank, a spring stop secured to the base adjacent the vertical support member, said spring stop having guide means through which the link passes, spring butt means at the other end of the link, spring butt adjustment means to adjust the location of the spring butt along the link, and a compression spring threaded by the link and positioned betwen the spring stop and the spring butt means whereby the mass of the retractable support upon rearward retraction is counter-balanced by the compression of the spring and assisted by the spring upon being raised.

8. In a retractable support having a fifth wheel support, a vertical support member, a base, a trailing link, and first hinge means coupling the support to the vertical member, second hinge means joining the vertical member and the base, and third hinge means hinging the trailing link to the vertical member; a spring counter-balancing system comprising, in combination, a crank coupled to the vertical support member adjacent the second hinge means and positioned to extend horizontally when the vertical support member is vertical, a link pivoted at one end to the crank, a spring stop secured to the base forward of the vertical support member, link guide means on said spring stop, spring butt means at the other end of the link, spring butt adjustment means to adjust the location of the spring butt along the link, and a compression spring threaded by the link and positioned between the spring stop and the spring butt means whereby the mass of the retractable support upon rearward retraction is counterbalanced by the compression of the spring and assisted by the spring upon being raised.

9. In a retractable support having a base, a fifth wheel support plate with a forwardly opening jaw, an impact lock means at the inner portion of the jaw for impact engagement with a pintle, a vertical support member, a trailing link, and hinge means for connecting the trailing link to the vertical support member, the fifth wheel support to the vertical support member, and the vertical support member to the base; the spring system comprising in combination
    a counter-balancing compression spring link;
    an adjustable spring stop at one end of the spring link;
    a crank at the base of the vertical support member;
    a spring stop secured to said base and disposed between said adjustable stop and said crank;
    a counter-balancing compression spring supported in compression between both said stops and coaxial with the spring link;
    means hingedly securing the end of the spring link opposite the adjustable spring stop to the crank with the counter-balancing compression spring urging said adjustable spring stop away from said crank thereby assisting to raise the vertical support member;
    a volute spring suspension means for connecting the fifth wheel support plate to the vertical support member;
    and a friction block frictionally engaging said support plate at the conenction between the volute spring suspension means and vertical support member whereby the impact of pintle engagement with the impact lock means is resisted sequentially by the impact lock means, the friction block and the counter-balance spring action to lockingly engage the fifth wheel support plate with the pintle.

10. In a retractable support having a base, a fifth wheel support plate with a forwardly opening jaw, an impact lock means at the inner portion of the jaw for impact engagement with a pintle, a vertical support member, and a trailing link; and hinge means for connecting the trailing link to the vertical support member, the fifth wheel support to the vertical support member, and the vertical support member to the base; the spring system comprising, in combination,
    a counter-balancing compression spring link;
    an adjustable spring stop at one end of the spring link;
    a crank at the base of the vertical support member;
    a spring stop secured to said base and disposed between said adjustable stop and said crank;
    a counter-balancing compression spring supported in compression between both said stops and coaxial with said spring link;
    means hingedly securing the end of the spring link opposite the adjustable spring stop to the crank with the counter-balancing compression spring urging said adjustable spring stop away from said crank thereby assisting to raise the vertical support member;
    a spring suspension means for connecting the fifth wheel support plate to the vertical support member;
    a short chain attached at each end beneath the ends of the fifth wheel support plate jaws;
    a yoke secured to the short chain for aligning movement therealong;
    a tow chain secured to the yoke;
    and a friction block frictionally engaging said support plate at the connection between the spring suspension means and vertical support member whereby the impact of pintle engagement with the impact lock means is resisted sequentially by the impact lock means, the friction block and the counter-balance spring action to lockingly engage the fifth wheel support plate with the pintle.

11. In a retractable support having a base, a fifth wheel support plate, with a forwardly opening jaw, an impact lock means at the inner portion of the jaw for impact engagement with a pintle, a vertical support member, and a trailing link; and hinge means for connecting the trailing link to the vertical support member, the fifth wheel support to the vertical support member, and the vertical support member to one base, the spring system comprising, in combination, a counter-balancing compression spring link;
an adjustable spring stop at one end of the spring link;
a crank at the base of the vertical support member;
a spring stop secured to said base and disposed between said adjustable stop and said crank;
a counter-balancing compression spring supported in compression between both said stops and coaxial with said spring link;
means hingedly securing the end of the spring link opposite the adjustable spring stop to the crank with the counter-balancing compression spring urging said adjustable spring stop away from said crank thereby assisting to raise the vertical support member;
a spring suspension means for connecting the fifth wheel support plate to the vertical support member;
series arranged pairs of volute springs in said spring suspension means;
and a friction block supported to frictionally engage said fifth wheel support plate at the connection between the series pairs of volute springs and the vertical support member.

References Cited in the file of this patent

UNITED STATES PATENTS

| | | |
|---|---|---|
| 2,093,761 | Kramer | Sept. 21, 1937 |
| 2,099,288 | Allen | Nov. 16, 1937 |

FOREIGN PATENTS

| | | |
|---|---|---|
| 1,164,042 | France | May 5, 1958 |

OTHER REFERENCES

Publication: Rock Island Holds Piggyback Clinic, in Railway Freight Traffic, February 1958.